United States Patent [19]

Tezuka et al.

[11] Patent Number: 5,528,383
[45] Date of Patent: Jun. 18, 1996

[54] FACSIMILE APPARATUS HAVING A FILE TRANSFER FUNCTION

[75] Inventors: Yoshiaki Tezuka; Yoshihiro Maei; Takashi Sakayama, all of Saitama, Japan

[73] Assignee: Fuji Xerox Co., Ltd., Tokyo, Japan

[21] Appl. No.: 376,143

[22] Filed: Jan. 20, 1995

[30] Foreign Application Priority Data

Jan. 26, 1994 [JP] Japan .................................. 6-023479

[51] Int. Cl.$^6$ ........................... H04N 1/327; H04N 1/333
[52] U.S. Cl. ........................... 358/435; 358/442; 358/468
[58] Field of Search .................................. 358/442, 468, 358/444, 434, 435, 436, 438, 439

[56] References Cited

U.S. PATENT DOCUMENTS 5,452,106  9/1995  Perkins .................................. 358/468

FOREIGN PATENT DOCUMENTS 2-134974  5/1990  Japan .
3-49463  3/1991  Japan .

OTHER PUBLICATIONS

"Terminal Equipments and Protocols For Telematic Services", ITU–T Recommendation T.30, pp. 39 and 87 (1993).

Primary Examiner—Scott A. Rogers
Attorney, Agent, or Firm—Finnegan, Henderson, Farabow, Garrett & Dunner

[57] ABSTRACT

The present invention provides a facsimile apparatus having a file transfer function which transmits file data to a receiving side utilizing one of a plurality of standardized file transfer modes which comprises first determining means for determining a specified file transfer mode, file description providing means for providing a file description unique to the specified file transfer mode if transmitting of a file description is necessary before a file is transmitted in the specified file transfer mode, file description storing means for storing the file description provided, second determining means for determining what file transfer modes can be set in the receiving side, selecting means for selecting a file transfer mode based on a determination result by the second determining means and the specified file transfer mode, converting means for converting the provided and stored file description into a file description unique to the selected file transfer mode if the selected file transfer mode is different from the specified file transfer mode, and transmitting means for transmitting the file data with the provided or converted file description to the receiving side in the case where transmitting of a file description is necessary before a file is transmitted in the selected file transfer mode, and transmitting only the file data to the receiving side in the case where transmitting of a file description is not necessary in the selected file transfer mode.

18 Claims, 7 Drawing Sheets

| CONVERSION TABLE | | CAPABILITY OF RECEIVING SIDE | | | |
|---|---|---|---|---|---|
| | | BTM ONLY | BTM AND DTM | BTM AND BFT | BTM, DTM AND BFT |
| SPECIFIED FILE TRANSFER MODE | BTM | NOT CONVERTED | NOT CONVERTED | NOT CONVERTED | NOT CONVERTED |
| | DTM | CONVERTED TO BTM | NOT CONVERTED | CONVERTED TO BFT | NOT CONVERTED |
| | BFT | CONVERTED TO BTM | CONVERTED TO DTM | NOT CONVERTED | NOT CONVERTED |

| PRIORITY ORDER TABLE | CAPABILITY OF RECEIVING SIDE | | | |
|---|---|---|---|---|
| | BTM ONLY | BTM AND DTM | BTM AND BFT | BTM, DTM AND BFT |
| SELECTED FILE DESCRIPTION | BTM | DTM | BFT | BFT |

FIG. 1

| CONVERSION TABLE | | CAPABILITY OF RECEIVING SIDE | | | |
|---|---|---|---|---|---|
| | | BTM ONLY | BTM AND DTM | BTM AND BFT | BTM, DTM AND BFT |
| SPECIFIED FILE TRANSFER MODE | BTM | NOT CONVERTED | NOT CONVERTED | NOT CONVERTED | NOT CONVERTED |
| | DTM | CONVERTED TO BTM | NOT CONVERTED | CONVERTED TO BFT | NOT CONVERTED |
| | BFT | CONVERTED TO BTM | CONVERTED TO DTM | NOT CONVERTED | NOT CONVERTED |

FIG. 2

| PRIORITY ORDER TABLE | CAPABILITY OF RECEIVING SIDE | | | |
|---|---|---|---|---|
| | BTM ONLY | BTM AND DTM | BTM AND BFT | BTM, DTM AND BFT |
| SELECTED FILE DESCRIPTION | BTM | DTM | BFT | BFT |

FACSIMILE APPARATUS HAVING A FILE TRANSFER FUNCTION

BACKGROUND OF THE INVENTION

1. Field of the Invention

The present invention relates to a facsimile apparatus having a file transfer function and in particular relates to a facsimile apparatus having a file transfer function which transmits and/or receives file data utilizing any of a plurality of standardized file transfer modes.

2. Discussion of the Related Art

Japanese Patent Application Unexamined Publication Nos. Hei. 2-134974 and Hei. 3-49463, for example, disclose transfer of file data in place of image information utilizing procedure of a facsimile apparatus for transferring image information.

However, since the conventional arts described above establish various settings utilizing a unique (non-standard) mode in communication protocols, there has been a problem that file transfer cannot be performed between machines supplied by different manufacturers.

A plurality of file transfer modes have been standardized by items regarding file transfer which were added to CCITT (presently, ITU-T) Recommendation T.30 in Feb. 1992, whereby file transfer between the machines of different manufacturers is made to be possible by utilizing the standardized transfer modes.

Each of the standardized transfer modes is defined as follows:

1) Basic Transfer Mode (hereinafter, BTM) provides means to exchange files of plural kinds (binary files, wordprocessor native format documents, bitmaps, etc.) without file descriptions.

2) Document Transfer Mode (hereinafter, DTM) provides means to exchange files of plural kinds containing file descriptions read by the user.

3) Binary File Transfer (hereinafter, BFT) provides means to exchange files of plural kinds containing file descriptions automatically processed at the receiving side.

The file description is structured information regarding the file, which is transmitted ahead of the file itself and concatenated with it.

As described above, the file description is unnecessary for file transfer performed in the BTM, but necessary for file transfer performed in the DTM or BFT mode.

Moreover, structure of the file description of the DTM is greatly different from that of the BFT mode. Therefore, though the transmitting side desires to carry out file transfer in the DTM, file transfer cannot be achieved in the case where the receiving side facsimile apparatus does not have the DTM.

Since there are various differences in the file transfer modes, in the case where the transmitter hopes to transfer a document in the DTM and the receiving side facsimile, apparatus does not have the DTM, file transfer cannot be carried out.

SUMMARY OF THE INVENTION

The present invention has been made in view of the above circumstances and has as an object a provision of a facsimile apparatus having a file transfer function which resolves the above-described problems.

A further object of the present invention is to provide a facsimile apparatus having a file transfer function such that file transfer is started in a file transfer mode which can be set in the receiving side facsimile apparatus.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the facsimile apparatus having file transfer function of this invention comprises first determining means for determining a specified file transfer mode, file description providing means for providing a file description unique to the specified file transfer mode if transmitting of a file description is necessary before a file is transmitted in the specified file transfer mode, file description storing means for storing the file description provided, second determining means for determining what file transfer modes can be set in the receiving side, selecting means for selecting a file transfer mode based on a determination result by the second determining means and the specified file transfer mode, converting means for converting the provided and stored file description into a file description unique to the selected file transfer mode if the selected file transfer mode is different from the specified file transfer mode, and transmitting means for transmitting the file data with the provided or converted file description to the receiving side in the case where transmitting of a file description is necessary before a file is transmitted in the selected file transfer mode, and transmitting only the file data to the receiving side in the case where transmitting of a file description is not necessary in the selected file transfer mode.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention. In the drawings, FIG. 1 is an example of a conversion table for converting a file transfer mode specified by a transmitting side facsimile apparatus into a different transfer mode in accordance with a capability of a receiving side facsimile apparatus;

FIG. 2 is an example of priority order table stipulating the priority order in selecting a file description in accordance with a capability of a receiving side facsimile apparatus;

DETAILED DESCRIPTION OF THE PREFERRED EMBODIMENTS

Figure 3:
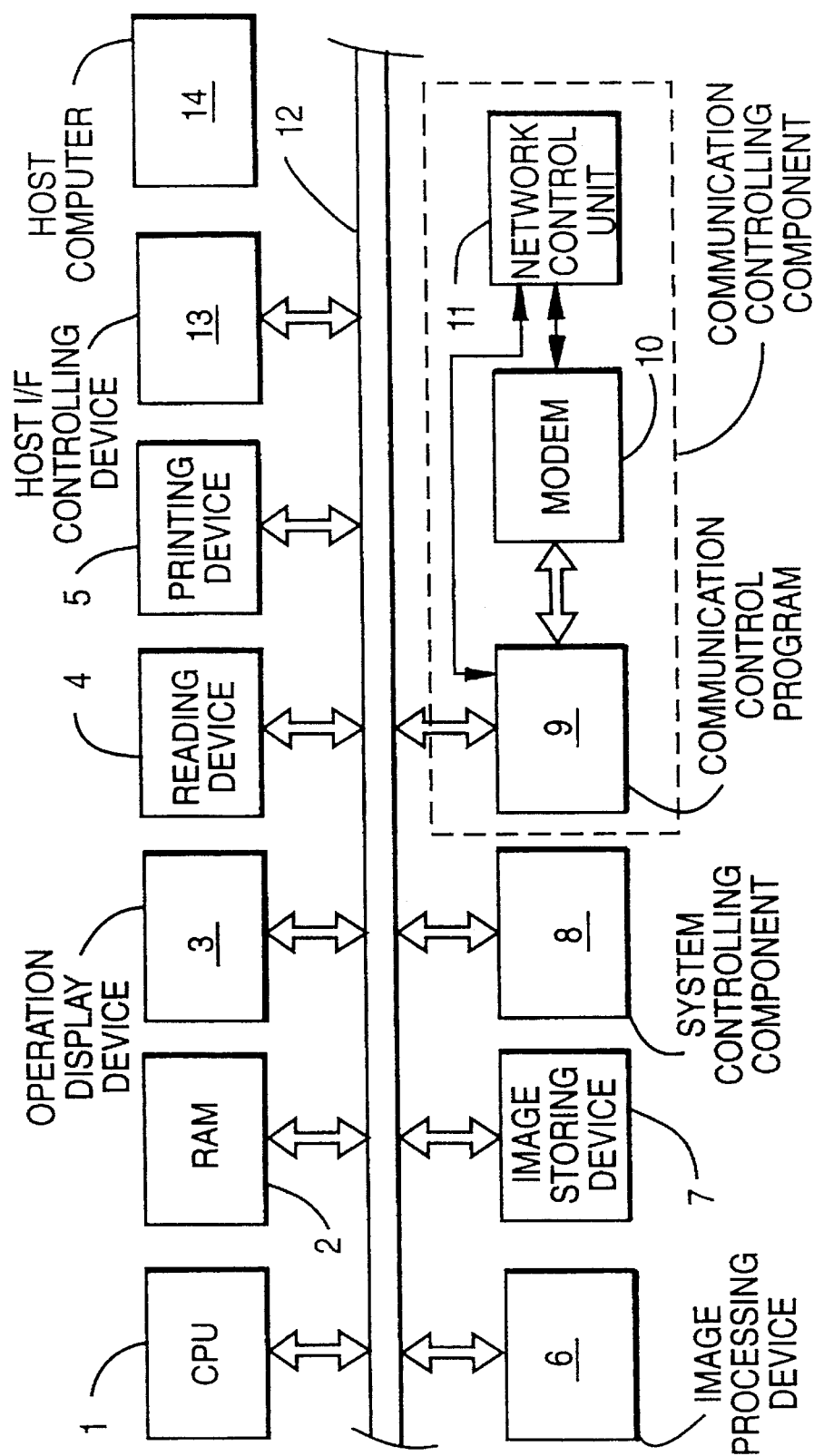
FIG. 3 is a block diagram of a facsimile apparatus having a file transfer function to which the present invention is applied.

Preferred embodiments of a facsimile apparatus having a file transfer function according to the present invention are now described in detail based on the drawings. FIG. 3 is a block diagram showing the construction of a main part of a facsimile apparatus to which the present invention is applied.

A CPU 1 carries out the controlling process of the whole facsimile apparatus and process of facsimile transmission control according to a program stored in a system controlling component 8. A RAM 2 is a memory used as a work area, for the control program. An operation display device 3 has an operation component comprises a keyboard including ten-key and a display component of a liquid crystal panel (or a CRT display) for providing instructions about operation of the facsimile apparatus or for displaying the instructions or a state of operation. A reading device 4 reads a document to be transferred using a CCD image sensor for example, and converts it to image information of an electrical signal. The image information read by the reading device 4 or received image information is stored in an image storing device 7. A printing device 5 prints the received image data or the like. An image processing device 6 performs coding and decoding (compression and expansion) between the image signal and a transfer code.

The system controlling component 8 comprises the ROM storing the program which controls the whole facsimile apparatus. A communication controlling component comprises a communication control program 9 for G3 facsimile apparatus, a modem 10 and a network control unit 11. The modem 10 is a modulation/demodulation device having a low-speed modem (V.21) for a transmission procedure signal and a high-speed modem (V.27ter, V.29, V.33, V.17 and so forth) for transmitting and/or receiving the image information. The network control unit 11 is a circuit interfacing with the general switched telephone network and comprises an automatic forward/inward function.

A host computer 14 which may be a workstation, personal computer or the like, is connected to the facsimile apparatus through a host I/F controlling device 13. Each of the circuits 1–11 and 13 in the facsimile apparatus transmits and/or receives the data through a system bus 12.

Figure 4:
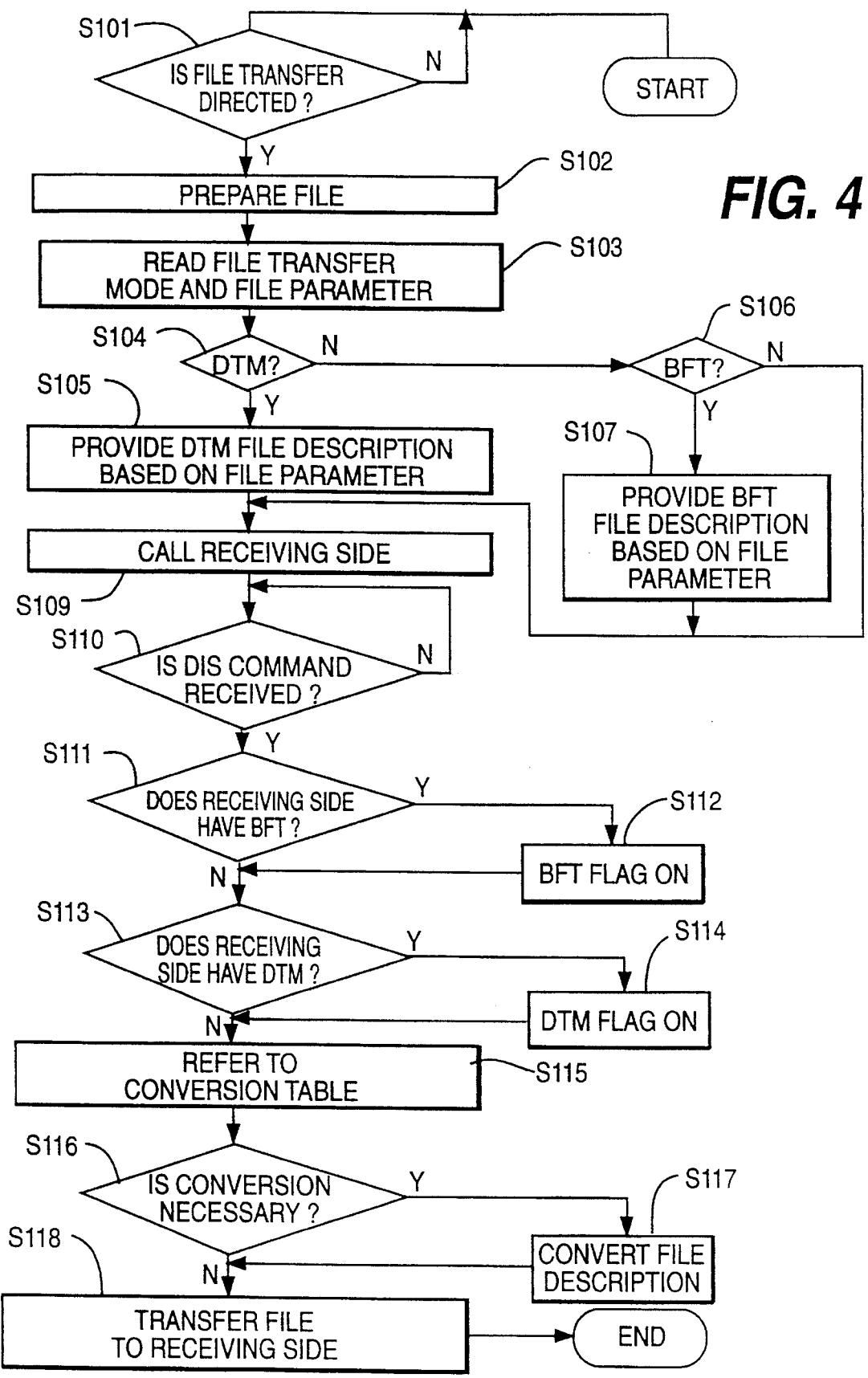
FIG. 4 is a flow chart showing an operation of a first embodiment of the facsimile apparatus having a file transfer function according to the present invention.

Following is a detailed description of operation of each embodiment according to the present invention. FIG. 4 is a flow chart showing the operation of a first embodiment of the facsimile apparatus according to the present invention which is, for example, a process carried out by the CPU 1 in accordance with the program stored in the system controlling component 8.

In step 101, it is determined if file transfer is directed by key operation on an operation and display panel 3 or by a host computer 14. If the file transfer is determined to be specified, a file to be transmitted is provided on the image storing device 7 in step 102.

Provision of the file is made by expanding the file data transmitted by the host computer 14, file data prepared by the facsimile apparatus by itself, or file data read out from a portable memory medium such as a floppy disk or IC card on the image storing device 7.

After file provision is completed, a file transfer mode and a file parameter are read out from the file in step 103. In step 104, it is determined if the file transfer mode read out from the file is the DTM and in the case where it is the DTM, a DTM file description is provided in step 105 based on the file parameter read out as described above.

If the file transfer mode is determined not to be the DTM in step 104 and determined to be the BFT mode in step 106, a BFT mode file description is provided in step 107 based on the file parameter read out as described above. If negative determinations are given in both steps 104 and 106, the file transfer mode which was read out is determined the BTM, and accordingly the file description is not provided.

The file description can be prepared by the facsimile apparatus itself. Otherwise, for example, it can also be prepared by the host computer and transmitted to the facsimile apparatus in the case where the facsimile apparatus receives the file data to be transmitted from the host computer.

After the file description is provided and stored as described above, a receiving side facsimile apparatus to which the file is transferred is called. When a DIS signal transmitted from the receiving side facsimile apparatus is received in step 109, the capability of the receiving side facsimile apparatus, regarding file transfer announced in the DIS command is determined in step 111.

Figure 8:
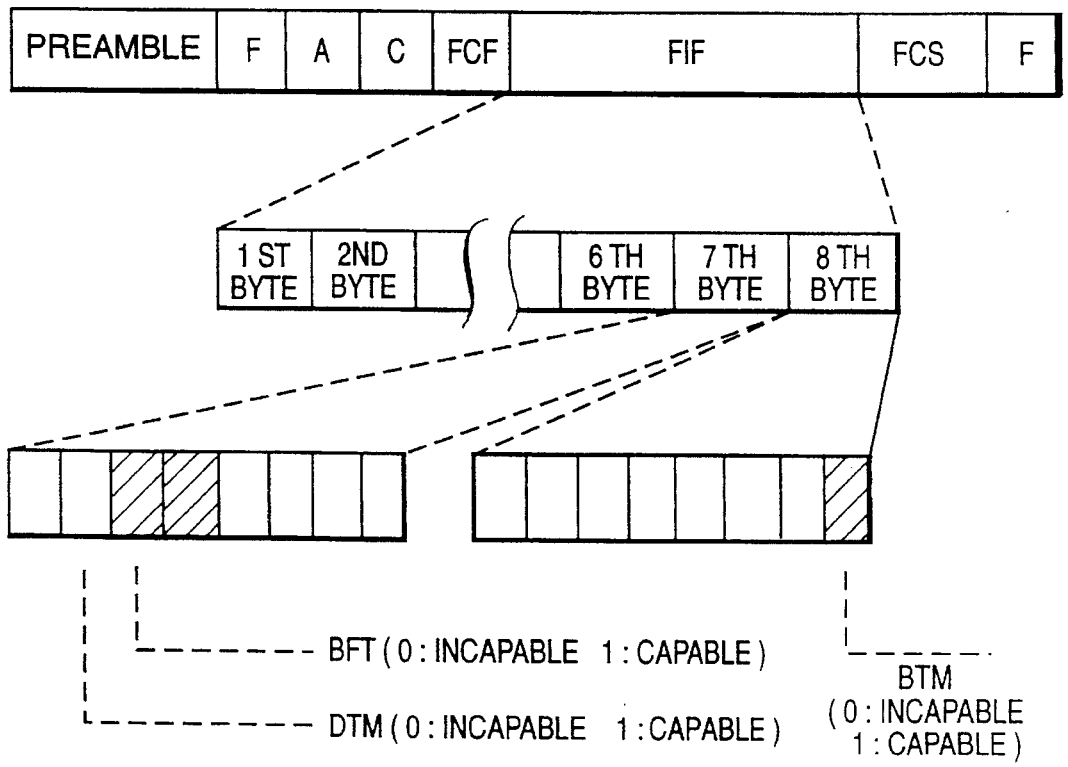
FIG. 8 shows an example of the frame structure of a DIS command.

FIG. 8 shows an example structure of the frame of the DIS command, which comprises a preamble (PA), a flag pattern (F), an address field (A), a control field (C), a facsimile control field (FCF), a facsimile information field (FIF), a frame check sequence (FCS) and so forth.

The capability for the file transfer is defined in 7th and 8th bytes of FIF as shown in FIG. 10. That is, whether there is capability for the BFT mode is defined in Bit 53 of FIF in accordance with the bit state, and in the same way, capability for the DTM is defined in Bit 54, capability for the BTM is defined in Bit 57 of FIF.

If a determination is provided in step 111 that the capability for the BFT mode is announced to be available, a BFT flag indicating the capability for receiving is set in step 112. In the same way, it is determined whether the capability for the DTM has been announced to be available in the DIS command in step 113 and if the capability for the DTM is available, a DTM flag is set in step 114.

After the determination of Capability for receiving the receiving side facsimile apparatus is completed, a conversion table shown in FIG. 1 is referred to based on the file transfer mode read out in step 103 and receiving capability flag for making a determination in step 116 whether the file transfer mode should be changed. The conversion table is stored in a predetermined area of the system controlling component 8, for example.

That is, in the case where the receiving side facsimile apparatus has capabilities for only the BTM and DTM though the file transfer mode specified in the file is the BFT mode, it is determined to be necessary to convert the file transfer mode BFT into the DTM corresponding to the conversion table shown in FIG. 1. In a similar way, in the case where the receiving side facsimile apparatus has only the BTM though the specified file transfer mode is the DTM, it is determined that the conversion of the file transfer mode DTM into the BTM is necessary. When the file transfer mode specified in the file is the DTM and the receiving side facsimile apparatus has the BTM and DTM, it is determined that conversion is not necessary.

If it is determined that the file transfer mode requires to be converted in step 116, the file description is also converted corresponding to the file transfer mode converted in step 117.

That is, if the receiving side facsimile apparatus has only the DTM and BTM though the file transfer mode specified in the file is the BFT mode, and it is determined that conversion of the file transfer mode BFT into the DTM is necessary, the BFT file description provided in step 107 is converted into the DTM file description.

Figure 7:
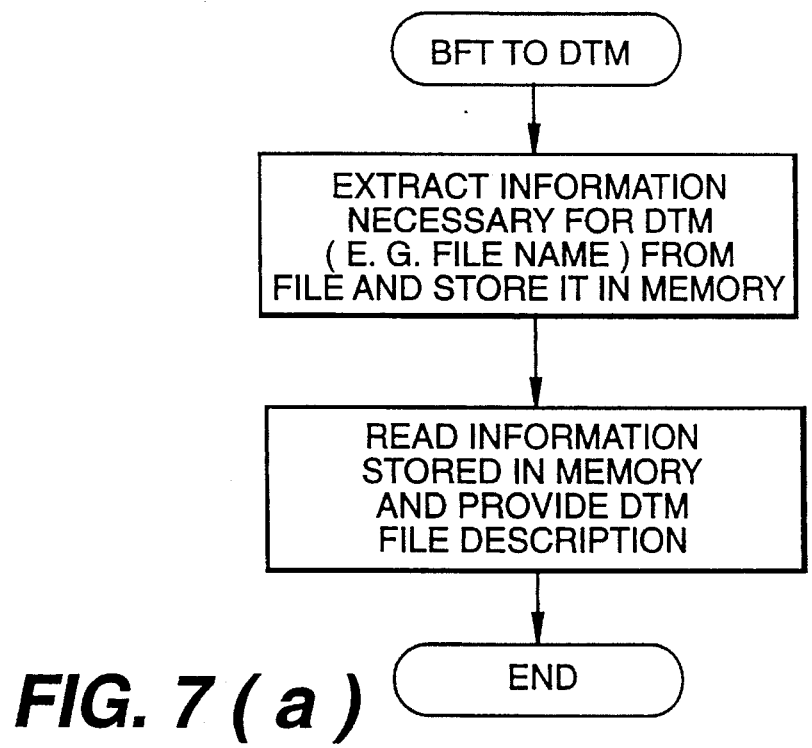
FIGS. 7 (a)–(d) are flow charts showing methods of converting a file description.
Figure 7:
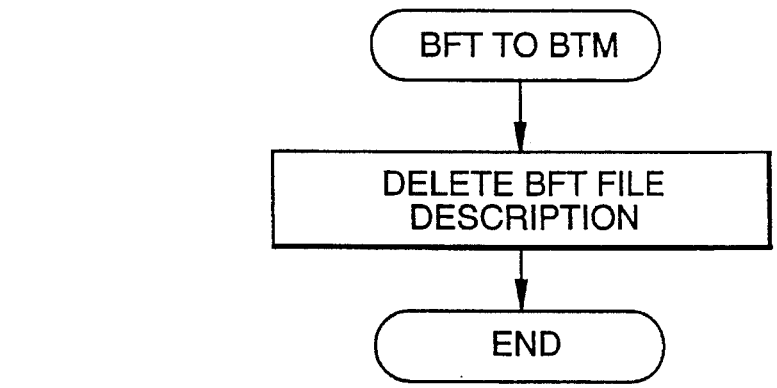
Figure 7:
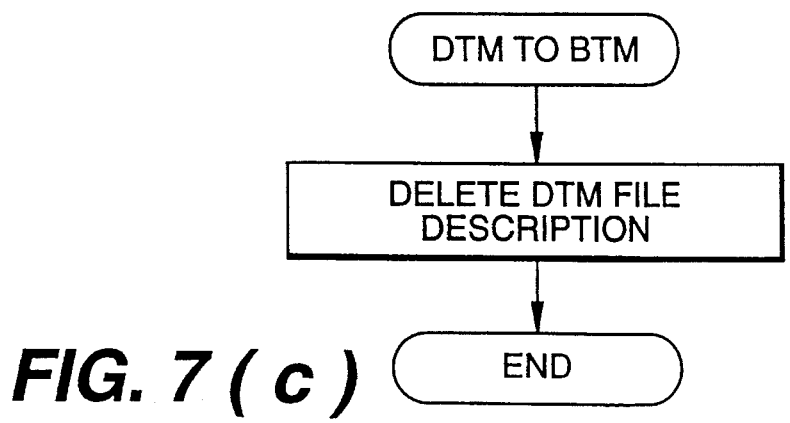
Figure 7D:
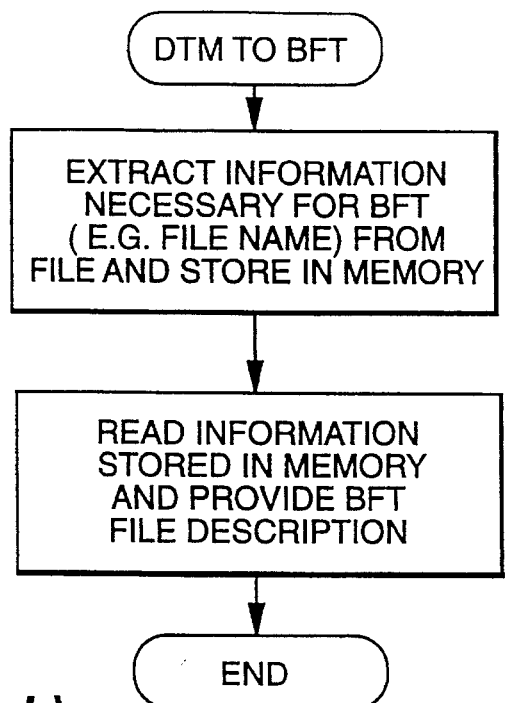

As same as described above, if the receiving side facsimile apparatus has only the BTM and BFT though the specified file transfer mode is the DTM, and it is determined that conversion of the file transfer mode DTM into the BFT is necessary, the DTM file description provided in step 107 is converted into the BFT file description as shown in FIG. 7(*d*). In the case where a converted file transfer mode is the BTM, a file description is not required; therefore the file description is deleted as shown in FIGS. 7(*b*) or 7(*c*).

In step 118, the file description corresponding to the file transfer mode is transmitted with the file (in the case of the BTM, only the file itself is transmitted).

According to this embodiment, if the receiving side facsimile apparatus does not have the file transfer mode specified by the transmitting side facsimile apparatus, the file transfer mode is converted according to the receiving capability of the receiving side facsimile apparatus and the, file description is automatically rewritten. Therefore, because the file transfer is executed in the file transfer mode corresponding to the receiving capability of the receiving side facsimile apparatus, the file transfer becomes possible even though the receiving side facsimile apparatus does not have the file transfer mode specified by the transmitting side facsimile apparatus thus preventing the transmission error caused by starting transmission in the file transfer mode which cannot be set in the receiving side facsimile apparatus, and ensuring the safe file transfer.

Moreover, according to this embodiment, in the case where the receiving side facsimile apparatus has a file transfer mode specified by the transmitting side facsimile apparatus, the file transfer mode can be selected; consequently, specifying of the file transfer mode by the transmitting side facsimile apparatus becomes possible.

Second Embodiment

Figure 5:
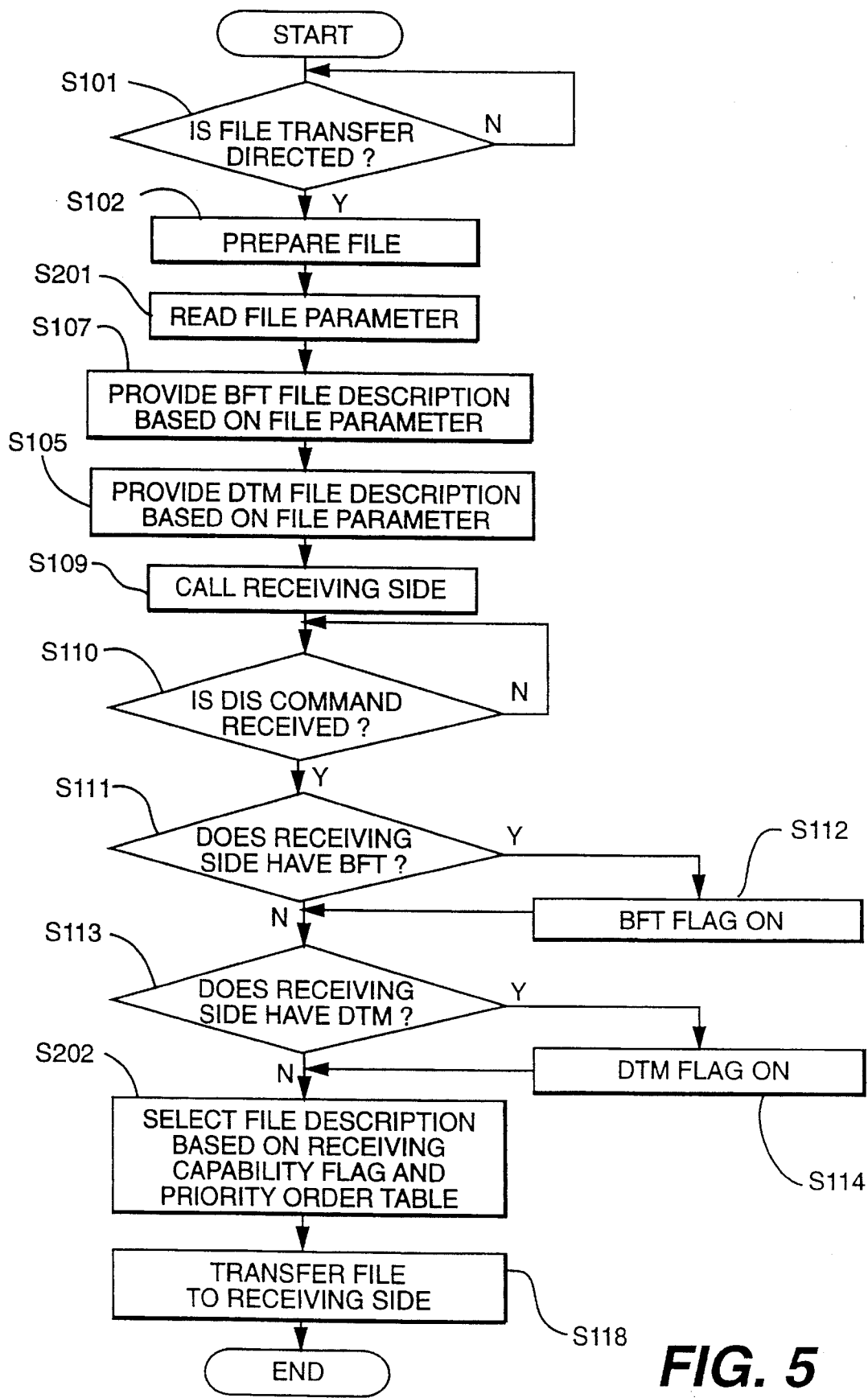
FIG. 5 is a flow chart showing an operation of a second embodiment of the facsimile apparatus having a file transfer function according to the present invention.

FIG. 5 is a flow chart showing an operation of file transfer process of a second embodiment in which steps corresponding to steps of the first embodiment have the same reference numbers as those of the first embodiment, thus omitting explanations.

This embodiment is characterized by that the file descriptions corresponding to respective file transfer modes are provided in advance and after determining the file transfer mode according to the receiving capability of the receiving side facsimile apparatus, the file description corresponding to the determined file transfer mode is selectively read out and transmitted with the file.

As same as the first embodiment, instruction of file transfer is given in step 101 and the file data is developed on the image storing device 7 in step 102 of this embodiment.

After the file parameter is read gut in step 201, the BFT file description is provided based on the file parameter in step 107 and the DTM file description is provided in step 105. In the same way, capability of the receiving side facsimile apparatus is determined based on the DIS signal transmitted from the receiving side facsimile apparatus in steps 109–114.

In step 202, the priority order table shown in FIG. 2, which can be stored in advance in the predetermined area of the system control component 8 as same as the conversion table described above, is referred to for selecting a file description in accordance with the receiving capability of the receiving side facsimile apparatus which has been determined.

That is, in the case where the receiving side facsimile apparatus has all the file transfer modes BTM, DTM and BFT, the BFT file description provided in step 107 is selected: in the case where the receiving Side facsimile apparatus has the BTM and DTM, the DTM file description provided in step 105 is selected: in the case where the receiving side facsimile apparatus has only the BTM, no file description is selected.

In step 118, selected file description is transmitted with the file (in the BTM, only the file is transmitted).

In this embodiment, as same as the first embodiment, the file transfer mode to be utilized is selected from the file transfer modes which the receiving side facsimile apparatus has, and consequently the transmission error caused by starting transferring the file in the file transfer mode which cannot be set in the receiving side facsimile apparatus, thus ensuring the safe file transfer.

According to this embodiment, further, each of file descriptions unique to respective file transfer modes are provided in advance and then the receiving side facsimile apparatus is called; therefore time from calling to starting transmission can be saved.

In addition, according to the present embodiment, since the most appropriate file transfer mode is automatically set in accordance with the receiving capability of the receiving side facsimile apparatus, a special operation for setting the file transfer mode is not required.

Third Embodiment

Figure 6:
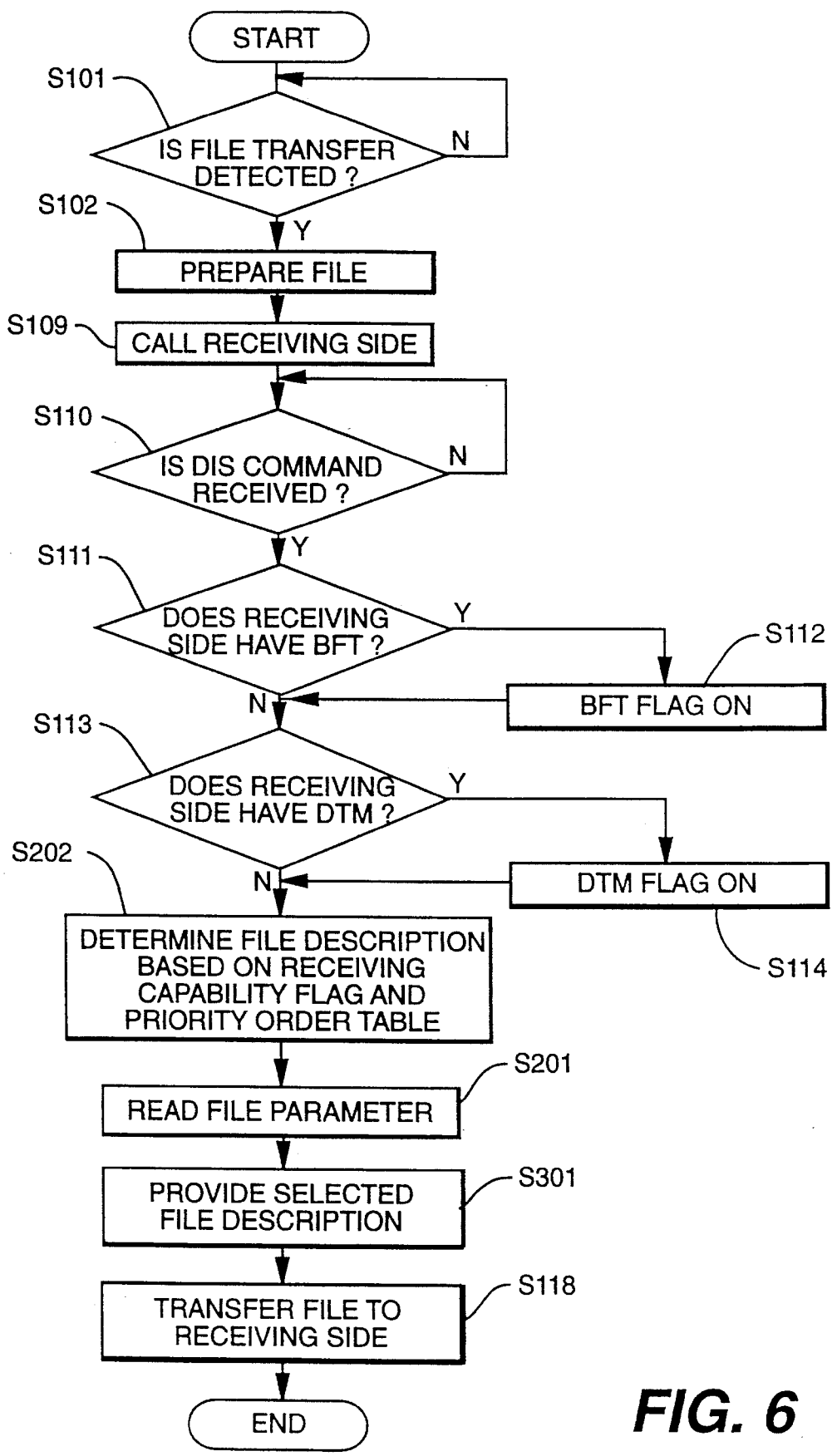
FIG. 6 is a flow chart showing an operation of a third embodiment of the facsimile apparatus having a file transfer function according to the present invention.

FIG. 6 is a flow chart showing an operation of the file transfer process of a third embodiment of the present invention, in which steps corresponding to steps of the first or second embodiment have the same reference numbers as those of the first or second embodiment, thus omitting explanations.

This embodiment is characterized in that the file transfer mode is decided by negotiation with the receiving side in advance and a file description concerning the decided file transfer mode only is provided.

In this embodiment, as same as described above, instructions about file transfer are given in step 101, the file data is developed on the image storing device 7 in step 102, and then the receiving side facsimile apparatus is called in step 109.

In steps 110–114, similar to the above description, receiving capability of the receiving side facsimile apparatus is determined based on the DIS command transmitted by the receiving side facsimile apparatus. In step 202, the file description is decided based on the determined receiving capability of the receiving side facsimile apparatus referring to the priority order table shown in FIG. 2. The file parameter is read out in step 201 and the file description unique to the decided file transfer mode is provided based on the file parameter in step 301.

That is, in the case where the receiving side facsimile apparatus has all the file transfer modes BTM, DTM and BFTy the BFT file description is provided: in the case where the receiving side facsimile apparatus has only the BTM and DTM, the DTM file description is provided: in the case where the receiving side facsimile apparatus has only the BTM, no file description is provided.

In step 118, the provided file description is transmitted with the file (in the case of the BTM, only the file itself is transmitted).

In the present embodiment, as same as the first embodiment and the second embodiment, the file transfer mode to be utilized is selected from the file transfer modes which can be set in the receiving side facsimile apparatus. Therefore, the transfer error caused by starting file transfer in a file transfer mode unavailable for the receiving side facsimile apparatus is prevented and reliable file transfer is ensured.

Moreover, according to the present embodiment, because the file description is provided after selecting the file transfer mode, it is not required to wastefully provide unnecessary file descriptions in advance. Consequently it is possible to utilize the memory effectively.

As described above, according to the present invention, which transfer modes can be set in the receiving side facsimile apparatus is determined before the file transfer is carried out. This makes it possible for the transmitting side to select a file transfer mode to be utilized from the file transfer modes available for the receiving side facsimile apparatus, whereby occurrence of transfer error caused by starting file transfer in a file transfer mode which cannot be set in the receiving side facsimile apparatus is prevented. Thus reliable file transfer is ensured.

According to first aspect of the present invention, in the case where the receiving side facsimile apparatus has a file transfer mode specified by the transmitting side facsimile apparatus, the file transfer mode is selected; accordingly, specifying of the file transfer mode at the transmitting side becomes possible.

According to the second aspect of the present invention, every file description unique to each file transfer mode is provided in advance and then the receiving side facsimile, apparatus is called, which results in saving the time from calling to starting transmission.

According to the third aspect of the present invention, the file description is provided after the file transfer mode is selected, and therefore it is not required to provide unnecessary file descriptions in advance and memory can be used effectively.

According to the fourth aspect of the present invention, the transmitting side facsimile apparatus can prepare the file descriptions by itself. Therefore, it can independently perform file transfer without connecting to the host computer such as a workstation.

According to the fifth aspect of the present invention, the file description can be externally input, and accordingly the construction of the facsimile apparatus can be simplified by setting the function of preparing the file descriptions in the host computer such as a workstation.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A facsimile apparatus having a file transfer function which transmits file data to a receiving side utilizing one of a plurality of standardized file transfer modes comprising:

first determining means for determining a specified file transfer mode;

file description providing means for providing a file description unique to said specified file transfer mode if transmitting of a file description is necessary before a file is transmitted in said specified file transfer mode;

file description storing means for storing said file description provided;

second determining means for determining what file transfer modes can be set in the receiving side;

selecting means for selecting a file transfer mode based on a determination result by said second determining means and said specified file transfer mode;

converting means for converting said provided and stored file description into a file description unique to said selected file transfer mode if said selected file transfer mode is different from said specified file transfer mode; and transmitting means for transmitting the file data with said provided or converted file description to the receiving side in the case where transmitting of a file description is necessary before a file is transmitted in said selected file transfer mode, and transmitting only the file data to the receiving side in the case where transmitting of a file description is not necessary in said selected file transfer mode.

2. The facsimile apparatus according to claim 1, wherein said selecting means selects said specified file transfer mode in the case where said specified file transfer mode can be set in the receiving side, and selects the most appropriate file transfer mode from the file transfer modes which can be set in the receiving side in the case where said specified file transfer mode cannot be set in the receiving side.

3. A facsimile apparatus having a file transfer function which transmits file data to a receiving side utilizing one of a plurality of standardize file transfer modes comprising:

file description providing means for providing every file description unique to each file transfer mode in which transmitting of said file description is necessary before a file is transmitted;

file description storing means for storing said file description provided;

determining means for determining what file transfer modes can be set in the receiving side;

selecting means for selecting the most appropriate transfer mode from the file transfer modes which can be set in the receiving side;

reading means for reading said file description corresponding to said selected file transfer mode; and transmitting means for transmitting said file description with the file data to the receiving side in the case where transmitting of the file description is necessary before the file is transmitted in said selected file transfer mode, and transmitting only the file data to the receiving side in the case where transmitting of file description is not necessary in said selected file transfer mode.

4. A facsimile apparatus having a file transfer function which transmits file data to a receiving side utilizing one of a plurality of standardized file transfer modes comprising:

determining means for determining what file transfer modes can be set in the receiving side;

selecting means for selecting the most appropriate transfer mode from the file transfer modes which can be set in the receiving side;

file description providing means for providing a file description unique to said selected file transfer mode in the case where transmitting of the file description is necessary before the file data is transmitted in said selected file transfer mode;

file description storing means for storing said file description provided; and transmitting means for transmitting said file description with the file data to the receiving side in the case where transmitting of the file description is necessary before the file is transmitted in said selected file transfer mode, and transmitting only the file data to the receiving side in the case where transmitting of file description is not necessary in said selected file transfer mode.

5. The facsimile apparatus according to claim 1, wherein said file transfer mode in which transmitting of the file description is necessary before the file data is transmitted is a Binary File Transfer (BFT) mode or a Document Transfer Mode (DTM), and said file transfer mode in which transmitting of said file description is not necessary is a Basic Transfer Mode (BTM).

6. The facsimile apparatus according to claim 2, wherein said file transfer mode in which transmitting of the file description is necessary before the file data is transmitted is a Binary File Transfer (BFT) mode or a Document Transfer Mode (DTM), and said file transfer mode in which transmitting of said file description is not necessary is a Basic Transfer Mode (BTM).

7. The facsimile apparatus according to claim 3, wherein said file transfer mode in which transmitting of the file description is necessary before the file data is transmitted is a Binary File Transfer (BFT) mode or a Document Transfer Mode (DTM), and said file transfer mode in which transmitting of said file description is not necessary is a Basic Transfer Mode (BTM).

8. The facsimile apparatus according to claim 4, wherein said file transfer mode in which transmitting of the file description is necessary before the file data is transmitted is a Binary File Transfer (BFT) mode or a Document Transfer Mode (DTM), and said file transfer mode in which transmitting of said file description is not necessary is a Basic Transfer Mode (BTM).

9. The facsimile apparatus according to claim 1, wherein said file description providing means includes file description preparing means for preparing said file description based on said file data.

10. The facsimile apparatus according to claim 2, wherein said file description providing means includes file description preparing means for preparing said file description based on said file data.

11. The facsimile apparatus according to claim 3, wherein said file description providing means includes file description preparing means for preparing said file description based on said file data.

12. The facsimile apparatus according to claim 4, wherein said file description providing means includes file description preparing means for preparing said file description based on said file data.

13. The facsimile apparatus according to claim 5, wherein said file description providing means includes file description preparing means for I preparing said file description based on said file data.

14. The facsimile apparatus according to claim 1, wherein said file description is externally input.

15. The facsimile apparatus according to claim 2, wherein said file description is externally input.

16. The facsimile apparatus according to claim 3, wherein said file description is externally input.

17. The facsimile apparatus according to claim 4, wherein said file description is externally input.

18. The facsimile apparatus according to claim 5, wherein said file description is externally input.

* * * * *

UNITED STATES PATENT AND TRADEMARK OFFICE
CERTIFICATE OF CORRECTION

PATENT NO. : 5,528,383
DATED : June 18, 1996
INVENTOR(S) : Yoshiaki TEZUKA et al.

It is certified that error appears in the above-indentified patent and that said Letters Patent is hereby corrected as shown below:

Claim 3, column 8, line 34, "standardize" should read --standardized--.

Claim 13, column 10, line 23, after "for" delete --I--.

Signed and Sealed this

Nineteenth Day of November, 1996

Attest:

BRUCE LEHMAN

*Attesting Officer*  *Commissioner of Patents and Trademarks*